United States Patent [19]
Cronson et al.

[11] 3,812,423
[45] May 21, 1974

[54] NETWORK TIME DOMAIN MEASUREMENT SYSTEM

[75] Inventors: Harry M. Cronson, Lexington; Peter G. Mitchell, Concord, both of Mass.

[73] Assignee: Sperry Rand Corporation, Great Neck, N.Y.

[22] Filed: July 16, 1973

[21] Appl. No.: 379,283

[52] U.S. Cl. .......................................... 324/58.5 A
[51] Int. Cl. .......................................... G01r 27/04
[58] Field of Search .................. 324/58.5 A, 58.5 B

[56] References Cited
UNITED STATES PATENTS
3,693,080    9/1972    Ross et al. ...................... 324/58.5 A
3,715,667    2/1973    Nicolson ........................ 324/58.5 B Primary Examiner—Stanley T. Krawczewicz
Attorney, Agent, or Firm—Howard P. Terry

[57] ABSTRACT

The forward and backward scattered energy of a high frequency network exposed to an incident base band impulse of electromagnetic energy in a transmission line is sampled by a compensation sampling system and the incident wave and reflected and transmitted response waves are employed in performing discrete Fourier transformations in a computation process yielding the complex characteristics of the network.

9 Claims, 4 Drawing Figures

NETWORK TIME DOMAIN MEASUREMENT SYSTEM

BACKGROUND OF THE INVENTION

1. Field of the Invention

The invention pertains to apparatus for measuring the complex high frequency characteristics of networks and more specifically concerns time domain apparatus for the accurate and rapid measurement of the high frequency complex characteristics of networks contemplated for use in high frequency apparatus.

2. Description of the Prior Art

In the past, measurements of the complex characteristics of high frequency networks have been made at fixed frequencies using relatively narrow band slotted line or impedance bridge systems of the high frequency type. Many time consuming measurements are required to be made with such prior art apparatus in order to span even a relatively narrow frequency range. Such prior art methods have been slow and cumbersome, since the measurements have generally required disconnecting and re-assembling the apparatus for each pair of independent measurements and are not applicable when measurements must be made rapidly over a considerable frequency span. For example, coaxial transmission line systems used previously required disassembly and rearrangement of the coaxial line fixtures between transmission and reflection measurements on the same network sample, a procedure which is excessively time consuming and can clearly lead to inaccuracies. Recently, advances in the art utilizing network analyzers and swept frequency sources have increased the speed and convenience of scattering measurements without requiring disassembly between transmission and reflection measurements. However, these new methods often employ an expensive array of generators to cover a wide band width.

Greatly improved methods have more recently evolved that utilize and measure the scattering responses of such networks to incident base band impulses in the time domain, rather than in the frequency domain. Such methods permit simultaneous display on a sampling oscilloscope of a wave form with representations of the incident impulse and its backward and forward scattered time-domain signatures, the latter being uniquely related to the intrinsic properties of the network under examination. However, though such systems often permit rapid and accurate measurement of network characteristics, they do not under all circumstances avoid the need for disturbing transmission line connections to the network under test, a requirement that is an inconvenience and can be expected to lead to measurement errors. Also, in such prior art devices, energy must flow for certain measurements twice through the network under test. Where the network under test has a relatively high insertion loss, the double pass of energy through it can undesirably reduce the signal to values below noise.

SUMMARY OF THE INVENTION

The present invention is high frequency or microwave system permitting the rapid and accurate measurement of the complex scattering characteristics of transmission line networks when subjected to an incident base band impulse of electromagnetic energy. The invention employs a transmission line configuration that permits insertion of the network therein and display on a sampling oscilloscope of wave form representations of the incident base band pulse and its forward and backward scattered time domain signatures, the latter being directly related to the characteristics of the network under test. The network under test does not need to be removed from the test system and networks having substantial insertion loss may be investigated.

DESCRIPTION OF THE PREFERRED EMBODIMENT

According to the present invention, apparatus is provided for the accurate and rapid measurement of the complex characteristics of electrical networks at high or microwave frequencies by observation of the forward and backward scattering responses of such networks to an impulsive electromagnetic wave form through the use of time-to-frequency domain processing techniques. In general, the measurement apparatus consists of an arrangement for exciting the network to be investigated in a transmission line system with a base band impulse of high frequency energy having a subnanosecond rise time. The incident pulse is itself processed by and may be displayed by a high frequency sampling oscilloscope system, and the time-stretched wave form is made available by the oscilloscope or other sample and hold device to be converted to a digital representation. The latter is read into a suitably programmed general purpose electronic digital computer, where the sampled wave form is converted into its Fourier transform to yield the complex spectrum of the incident impulse.

In a similar manner, the transient wave forms transmitted through the network and back scattered from the network under investigation are then also successively processed and may be displayed by the sampling oscilloscope, are converted into digital data, and are finally subjected to Fourier transformation in the digital computer. With appropriate adjustments to ensure, as will be explained, that the time domain reference is the same for each of the successive measurements, ratios of the reflected wave spectrum to the incident wave spectrum and of the transmitted wave spectrum to the incident wave spectrum are developed. As will be demonstrated, these ratio values are manipulated so as to yield the respective reflection and transmisison scattering coefficients $S_{11}(\omega)$ and $S_{21}(\omega)$ of the network under study in a manner generally similar to that employed in the G.F.Ross U.S. Pat. No. 3,693,080, issued Sept. 19, 1972 for "Time Domain Measurement of High Frequency Complex Permittivity and Permeability of Transmission Line Enclosed Material Sample", assigned to the Sperry Rand Corporation.

Figure 1:
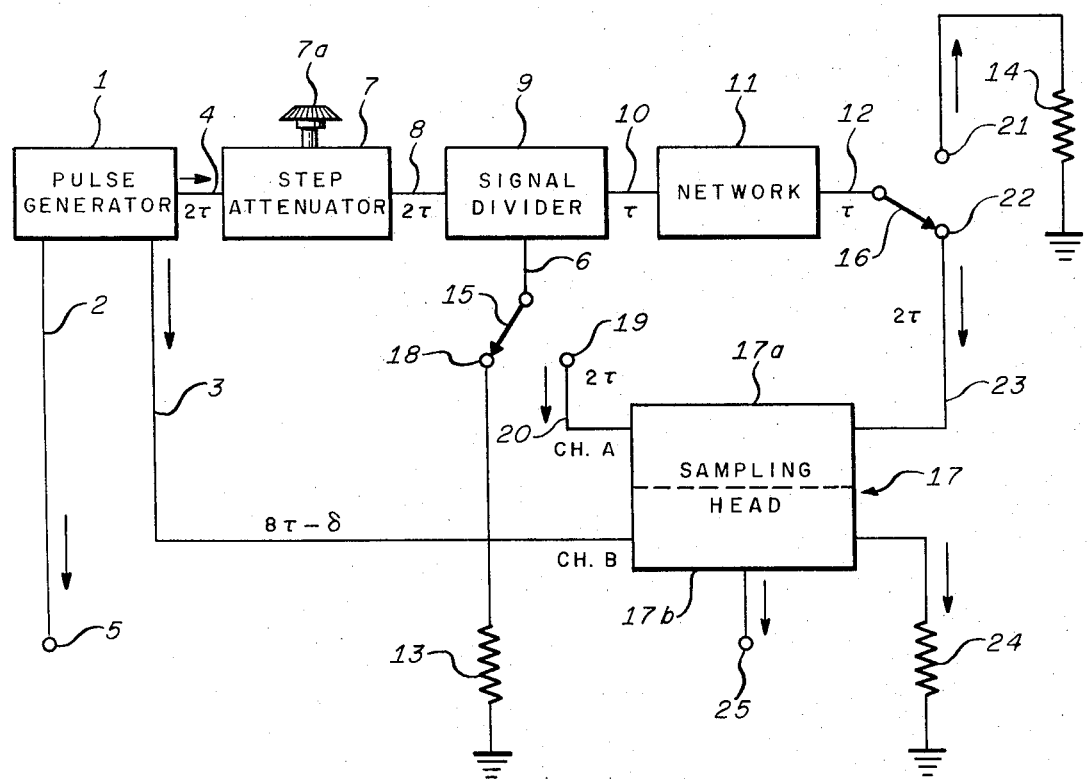
FIG. 1 is a diagram of the preferred form of the invention showing electrical components and their interconnections.

In FIG. 1, the measurement apparatus is excited by and synchronized with a conventional pulse generator 1 of a well known type for the generation of very short duration pulses which may be sub-nanosecond or base band electromagnetic pulses typically having rise and fall times of less than 100 picoseconds. Pulse generator 1 has a conventional pretrigger output 2 which provides a pulse some 80 nanoseconds in advance of the main pulse appearing in lines 3 and 4; as will be seen, the pretrigger pulse is used for operation of the sampling oscilloscope 26. According to the invention, transmission lines 3 and 4 have particular lengths in terms of propagation times of energy passing through them and have lengths actually in terms of a characteristic delay unit $\tau$ which, for example, may be 2.7 nanoseconds. It will be seen that transmission lines 4, 8, 10, 12, 20, and 23 have characteristic propagation times each related to integral multiples of $\tau$. These delays serve to keep unwanted signals out of the time window 54 of interest, as will be seen from FIG. 2, and ensure that the transmitted and reflected wave forms arrive within the time window 54.

For direct transmission through a network 11 under test, pulse generator 1 feeds base band pulses delayed by 2 $\tau$ with respect to their times of generation to precision step attenuator 7. Step attenuator 7 is a commercially available calibrated device whose function will be further discussed and which may be adjusted incrementally by operation of a manual or other control 7a. The insertion loss created by calibrated step attenuator 7 is set at different levels during the measurement operation, as will be seen.

The output of step attenuator 7 is applied through a transmission line 8 having a characteristic delay of 2 $\tau$ to the triple port signal divider or directional coupler 9, which may be a commercially available resistive or other power divider having, in addition to the input port at transmission line 8, an output port 6 and an output transmission line 10. One output port of divider 9 is coupled by the transmission line 10, which has a characteristic propagation delay of $\tau$, to the network 11 whose characteristics are to be examined by operating the invention. Transmission line 12 at the output of the network 11 has a characteristic propagation delay equal to $\tau$. To minimize systematic measurement errors which might be caused by undesired reflections between network 11 and transmission lines 10 and 12, high quality lines with low reflection connectors are used. Such precision lines are readily available on the market. Transmission line elements 6 and 12 cooperate with the respective manually or otherwise operated switches 15 and 16 to supply signals to the conventional sampling head 17, as will be described. Switches 15 and 16 are broad band signal-pole double-throw switches of a kind readily available in the market.

In the position of switch 16 shown in FIG. 1, the signal flowing through the transmission line 12 is coupled by switch 16 and contact 22 through transmission lines 23 to a first input of the Channel A circuit 17a of sampling head 17. Transmission line 23 has a delay of 2 $\tau$. When switch 16 is moved to the contact 21, signals flowing in transmission line 12 are coupled to a matched load 14, wherein they are dissipated without reflection. In the position of switch 15 shown in FIG. 1, the signal flowing in transmission line port 6 is coupled by switch 15 and contact 18 to the matched load 13, where its energy is dissipated without reflection. When switch 15 is moved to the contact 19, signal flow is through port 6, switch 15, and contact 19, then through the transmission line 20 to a second input of the Channel A circuit 17a of sampling head 17. Transmission line 20 has a characteristic delay of 2 $\tau$. The Channel B circuit 17b of sampling head 17 is supplied by transmission line 3, the latter having a propagation delay of 8 $\tau - \delta$, with reference pulses from pulse generator 1; the second port of the Channel B circuit 17b is connected to ground through the matched load 24.

Figure 3:
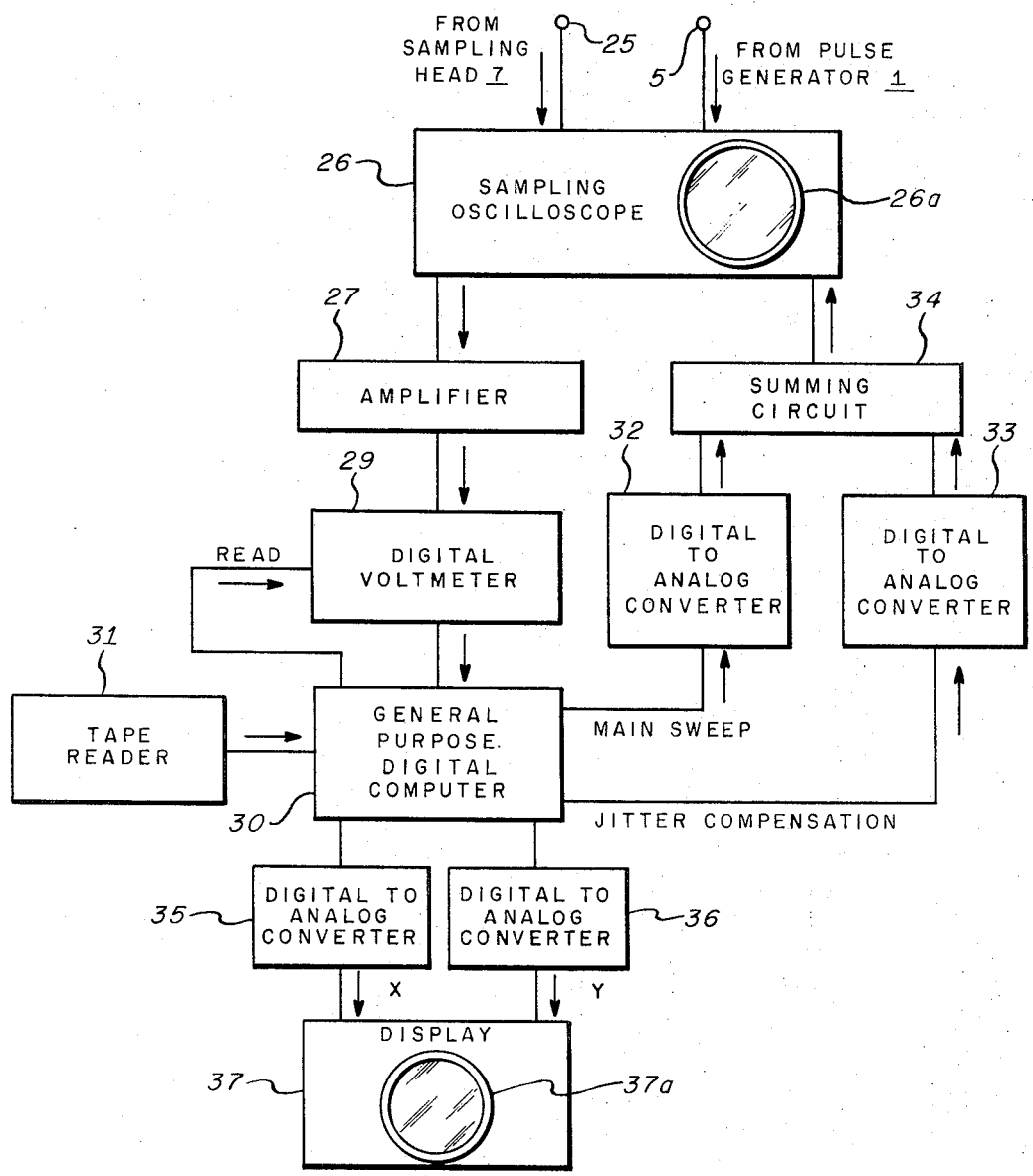
FIG. 3 is a block diagram of apparatus used in connection with that of FIG. 1.

The outputs of the sampling head 17 are supplied at terminal 25 for use in the apparatus of FIG. 3 along with reference or synchronizing pulses from pulse generator 1 appearing at terminal 5. It may be assumed in the practical sense that the propagation delays in the step attenuator 7, signal divider 9, transmission line port 6 and switches 15 and 16 are very small or substantially zero. The value of delay $\delta$ is yet to be discussed.

The two broad band switches 15, 16 are thus used to control the presence or absence of signals at inputs to sampling head Channel A circuit 17a. In one mode T of operation when signals to be measured are transmitted through the network 11 under test, switch 16 is at contact 22 and switch 15 is at contact 18, as shown in FIG. 1. In the mode T, only the waves transmitted through network 11 reach sampling head Channel A circuit 17a. In a second mode of operation R, switch 16 is at contact 21 and switch 15 is at contact 19; now, the signals passing through signal divider 9 into transmission line port 6, including the first reflection from the network 11 under test, are fed into the sampling head Channel A circuit 17a. In a third or intermediate mode I, which mode is not actually a measurement mode, switches 15 and 16 are respectively placed at contacts 18 and 21, sampling head Channel A circuit 17a thus being entirely disconnected from pulse generator 1. Mode I is used in the transitional state whenever calibrated step attenuator 7 is being stepped so as to protect the diode sampler circuits in sampling head 17 from destruction.

Figure 2:
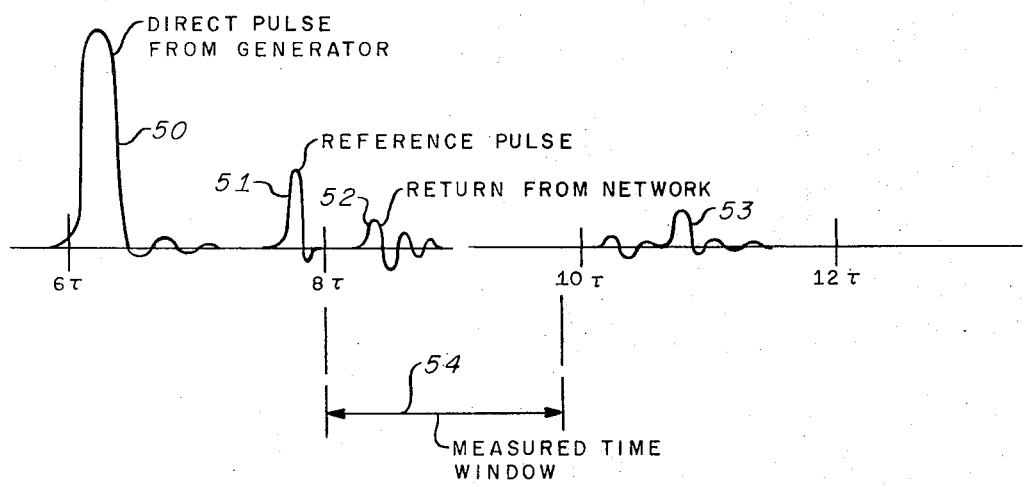
FIG. 2 is a graph showing wave forms characteristic of the apparatus of FIG. 1.

Actual measurements of the properties of a selected network 11 are performed in a manner similar to the measurement in mode R which will now be discussed in detail. All measurements in mode R are made similarly in the single time window 54 which is a little shorter than 2 $\tau$. For example, a typical operating system has 2 $\tau$ = 5.4 nanoseconds and a window 54 that is 5 nanoseconds in time duration, the relative shortening of the time window being selected for precluding the undesired effects of the possible presence of spurious signals at the edges of the window 54. In the R mode, switch 16 is at contact 21 and switch 15 is at contact 19; FIG. 2 illustrates the signals that would be displayed on a sampling oscilloscope over a 6 $\tau$ interval. Referring to FIG. 2, the first signal to be displayed is the incident pulse 50 received directly from pulse generator 1 at the transmission line 20 input of the sampling head Channel A circuit 17 a after passage through signal divider 9. A typical pulse of this type generated at zero time arrives at sampling head 17 at about time 6 $\tau$. The reference pulse 51 arrives over transmission line 3 at sampling head 17 at about time 8$\tau - \delta$, where $\delta$ is defined as a time delay such that reference pulse 51 has decreased to negligible amplitude before the start of time window 54. For example, $\delta$ may be 600 picoseconds when $\tau$ is selected to be 2.7 nanoseconds. Thus, the reference pulse 51 arrives just before the start of the window 54. Next, the desired pulse 52 containing information of real interest about network 11 and reflected therefrom arrives at sampling head 17 at time 8 $\tau$. Any succeeding pulses 53 are those caused by minor but undesired reflections at transmission line component interfaces that arrive later than time window 54 and after time 10 $\tau$.

Thus, the test wave form $v_R$ reflected from network 11 is measured in the R mode of the apparatus with switch 16 at contact 21 and switch 15 at contact 19. In preparation, the calibrated step attenuator 7 has been set, using mode I of the apparatus, to a value $A_R$ to provide the largest possible oscilloscope deflection for the scale being used; thus, for networks 11 under test having very low reflected energy, $A_R$ is nominally 0 dB. All subsequent reflection measurements on the seelected network 11 are made with the same attenuator setting. To avoid confusion, it will be understood that time domain quantities such as $v_R$ are denoted herein by lower case letters, whereas frequency domain quantities such as $A_R$ are denoted by upper case letters. When quantities such as $V_R$ are introduced, it will be understood that $v_R$ and $V_R$ are discrete Fourier transform pairs.

To measure the wave $v_T$ transmitted through network 11, the apparatus is placed in the T mode with switch 15 on contact 18 and switch 16 on contact 22. In preparation, the apparatus is first placed in the I mode and the calibrated step attenuator is stepped to a setting $A_T$ to give the largest possible deflection on the sampling oscilloscope. All subsequent transmission measurements made on the selected network 11 are made with the same attenuator setting.

It will be seen that measurements of three additional quantities are required to be made; these are $v_{T(i)}$, $v_{R(sc)}$, and $v_B$, as will be explained. The quantity $v_{T(i)}$ is the transmitted incident signal supplied through transmission lines 4, 8, 10, 12, and 23 by pulse generator 1. For this purpose, lines 10 and 12 are directly connected and switch 16 is placed on contact 22 and switch 15 on contact 18; thus, a network to be tested is absent from the test circuit. Attenuator 7 is first stepped to a value $A_{T(i)}$ for maximum deflection of the sampling oscilloscope indicator, as before.

The value of $v_{R(sc)}$ is obtained without the presence of a network 11 and with a short circuit coupled in its place at the end of transmission line 10. Switch 15 is placed on contact 19 and switch 16 is placed on contact 21. The calibrated attenuator 7 is again set for maximum indicator deflection at some value $A_{R(sc)}$. The quantity $v_B$ (the common background voltage) is measured with switches 15 and 16 on the respective contacts 18 and 21; this procedure records any background voltage in the time window 54 due to the presence of the reference pulse 51 in the Channel B circuit 17b of sampling head 17. Utilizing the foregoing measurement procedure provides that the calibrated step attenuator 7 is adjusted for each wave form recorded for obtaining maximum possible sampling oscilloscope deflection for comparing the incident wave form $v_{T(i)}$ and the test wave forms $v_T$ and $v_R$, thus maximizing the signal-to-noise ratio of the wave forms.

As will be further explained in connection with FIG. 3, once the wave forms $v_T$, $v_R$, $v_{T(i)}$, $v_{R(sc)}$, and $v_B$ are converted into digital format and stored in the general purpose digital computer 30, the desired scattering coefficients $S_{11}$ and $S_{21}$ are to be formed using the following equations. With the time domain scattering coefficients $s_{11}$ and $s_{21}$ defined as the inverse discrete Fourier transforms of $S_{11}$ and $S_{21}$, respectively, the relation between the measured wave forms and the transmitted scattering coefficient $s_{21}$ of network 11 is:

$$v_T - v_B = s_{21} * v_i \quad (1)$$

where *denotes conventional mathematical convolution; $v_i$ is the incident voltage entering the network 11 along transmission line 10 with attenuator 7 in the $A_T$ position. However, $v_i$ is also given by:

$$v_i = a_T * v_g \quad (2)$$

The quantity $a_T$ is the impulse response of step attenuator 7 at the previously defined setting $A_T$. The value $v_g$ is the amplitude of the wave form that would be measured at sampling head 17 with the step attenuator set at 0 dB and with lines 10 and 12 connected directly together (network 11 is absent). The transmitted incident voltage $v_{T(i)}$ is related to $v_g$ by:

$$v_{T(i)} - v_B = a_{T(i)} * v_g \quad (3)$$

By combination, equations (1), (2), and (3) yield the relation:

$$(v_T - v_B)/(v_{T(i)} - v_B) = (s_{12} * a_T * v_g)/(a_{T(i)} * v_g) \quad (4)$$

Taking the discrete Fourier transforms of both sides of equation (4) and rearranging yields:

$$S_{21} = A_{T(i)}/A_T \cdot (V_T - V_B)/V_{T(i)} - V_B \quad (5)$$

The upper case notation of S's, A's, and V's represents the discrete Fourier transform of the respective value of the s's, a's, and v's. Because the selected attenuation of step attenuator 7 is known and the other quantities are measured values, the scattering coefficient $S_{21}$ may be calculated directly from equation (5).

In a similar manner, it may be observed that the relation between the measured wave form and the reflected scattering coefficient $s_{11}$ of network 11 is:

$$v_R - v_B = -s_{11} * v_s \quad (6)$$

where the value of $v_s$ is the voltage reflection from a short circuit at the end of the transmission line 10 with attenuator 7 in the $A_R$ position and without the presence of network 11. The minus sign is introduced because $v_s$, upon reflection from the short circuit, takes on the sign opposite to the incident signal. However, $v_s$ is also given by:

$$v_s = -a_R * v_g \quad (7)$$

The quantity $a_R$ is the impulse response of step attenuator 7 at the previously defined setting $A_R$. The voltage reflected from the short circuit $v_R(sc)$ is related to $v_g$ by:

$$v_{R(sc)} - v_B = -a_{R(sc)} * v_g \quad (8)$$

By combination, equations (6), (7), and (8) yield the relation:

$$(v_R - v_B)/(v_{R(sc)} - v_B) = (-s_{11} * a_R * v_g)/(a_{R(sc)} * v_g) \quad (9)$$

Taking the discrete Fourier transform of both sides of equation (4) and rearranging yields:

$$S_{11} = -(A_{R(sc)}/A_R) \cdot (V_R - V_B)/(V_{R(sc)} - V_B) \quad (10)$$

It is evident by inspection of the foregoing analysis that the solution of the equations, such as equations (5) and (10), may be accomplished by any of several known methods, including the use of a cooperative assembly of known analog or digital data processing or computing circuits. For example, the several equations involve simple arithmethic operations such as addition, subtraction, multiplication, and division. Many examples of both analog an digital computation elements are available in the prior art for accomplishing computer operations and it is well known that they may readily be coupled together in cooperative relation for attaining desired results such as are presently required. It is furthermore evident that a conventional general purpose digital or analog computer may be employed for the purpose. It is obviously well within the ordinary skill of digital computer programmers to process the equations discussed above, to create flow charts, and to translate the latter into computer routines and subroutines for solution of such equations along with a compatible computer language for processing input data and instructions to produce outputs directly useful for application, for example, in a standard display.

The foregoing considerations will be apparent from an understanding of FIG. 3, wherein terminal 25 represents the sampling head data input connection to a conventional externally synchronized sampling oscilloscope 26, hich may be supplied with a cathode ray tube indicator 26a, and which may be synchronized by pulses from pulse generator 1 when applied to its terminal 5. The sampled output from oscilloscope 26 is supplied through a conventional amplifier 27, if amplification and filtering are desired, to a conventional digital voltmeter or analog-to-digital converter 29, wherein the analog signals supplied by oscilloscope 26 are converted to the digital representations of the kind required for manipulation within the conventional general purpose digital computer 30. Oscilloscope 26 may be internally controlled or computer 30 may be used in a conventional manner to control the reading out of digital voltmeter 29 and likewise to synchronize the timing and operation of sampling oscilloscope 26 in a conventional manner. For the latter purpose, main sweep signals for use in oscilloscope 26 may be generated by computer 30 and supplied through digital-to-analog converter 32 to the sweep circuits of oscilloscope 26. Likewise, sweep jitter compensation signals may originate in the general purpose computer 30. These are processed by digital-to-analog converter 33, after which they are added to the main sweep signals in the conventional summing circuit 34 for application within sampling oscilloscope 26. For the purpose of simultaneous reduction of additive voltage drift and timing shifts, oscilloscope 26 may employ a triple-point scanning mode of operation. Instead of a common saw tooth wave sweep, the $x$ coordinate deflection of the cathode ray beam of sampling oscilloscope 26 may be driven in discrete steps to form a staircase wave by general purpose digital computer 30.

Operation of computer 30 may be controlled by a program stored within an interior memory system or, as shown in FIG. 3, the operating program may be punched or otherwise applied to tape for processing by a conventional tape reader 31 and thereby supplied to computer 30. The program, as noted before, may be designed to determine, in a conventional manner, the internal operation of computer 30, as well as the operation of oscilloscope 26 and other ancillary equipment. Otuput signals derived by computer 30 are converted to analog voltages by digital-to-analog converters 35 and 36 for supply to the respective $x$ and $y$ deflection plates of cathode ray indicator tube 37a of display 37.

Sampling oscilloscope 26 may be a conventional apparatus wherein a sampling gate is adapted to be scanned continuously across successive repetitions of a repetitive wave form and is then returned to an initial position for recycling. Such sampling oscilloscopes have been employed in the past in the study of the impulse properties of high frequency circuits and have proven to be a valuable tool in such investigations. In using such devices, the effects of short term random fluctuations of the amplitude and timing of the wave forms passed through the high frequency circuit under study are successfully reduced by making repeated scans of the wave form, thereby averaging the random fluctuation signals to zero. However, there may be present long term amplitude drifts of the type found where high gain, wide band amplification circuits are required for proper application of the sampling system. Such long term amplitude and timing drifts are preferably eliminated in the present apparatus by employing an advanced type of sampling oscilloscope system providing means for compensating for long term amplitude and time drifts. A preferred sampling oscilloscope system is the subject of the A.M.Nicolson U.S. patent application Ser. No. 844,021 for a "Method and Means for Compensating Amplitude and Time Drifts in Sampling Wave Form Systems", filed July 23, 1969, now U.S. Pat. No. 3,584,309, and assigned to the Sperry Rand Corporation.

Figure 4:
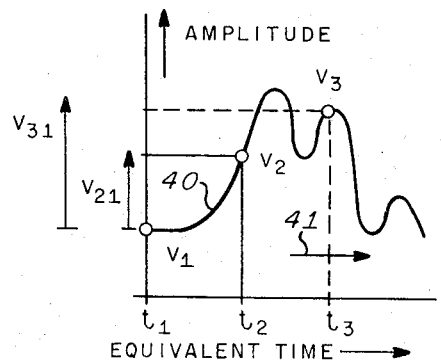
FIG. 4 is a graph of a wave form useful in explaining operation of the apparatus of FIG. 3.

An improved sampling oscilloscope system such as the Nicolson device, under control of the general purpose digital computer 30, is preferably used in the system of FIG. 3. The sampling oscilloscope 26 provides means for obtaining a first sampling of the magnitude of a wave form at time $t_1$ as illustrated in FIG. 4, which time is established with respect to a time base provided by the general purpose computer 30 and synchronized with the wave form under study. This first sample $v_1$ is taken at time $t_1$ on the curve of FIG. 4 on a portion of the wave having a zero slope. Because it has zero slope, the magnitude of the sample obtained is seen to be substantially unaffected by any timing drifts present in the system. It is recognized, however, that the amplitude $v_1$ will be adversely affected by amplitude drifts of the system.

Sampling oscilloscope 26 also obtains a second sample $v_2$ of the wave form. This is taken with respect to the time base on a portion of the wave form having a slope of relatively large magnitude with respect to the zero slope of the first sample. The second sample $v_2$ magnitude thus obtained is clearly affected by the time drifts of the system and is furthermore, significantly affected also by system amplitude drifts to the same degree as is affected by the magnitude of the first sample. Means provided within computer and its interface elements measure the difference in magnitudes of the wave form $(v_2 - v_1)$ obtained at the two successive sampling times and the initial difference $(v_2 - v_1)_0$ is stored, thereby providing a reference magnitude related solely to the timing of the system, by which reference magnitude subsequently occurring time drifts may be compensated.

Thus, prior to each subsequent sampling of the wave form, amplitude samples of the wave are obtained at the two reference sampling times and the difference is obtained between the sampled magnitudes, which difference is then compared to the stored reference. The error signal provided thereby is related to any undesired time drift of the system and is used to compensate the sampling time of the associated subsequent sample of the wave form. Each subsequent sample is compensated for amplitude drifts by subtracting the magnitude of the wave form obtained at the associated zero slope of the sampling time form the magnitude obtained during the sampling time at which the subsequent sample was taken. The timing drift error signal obtained during a sampling cycle is also used to compensate the two reference sampled times of the next following cycle.

In FIG. 4, a purely abstract wave form 40 is illustrated, wave form 40 being subject to long term amplitude drifts and also to timing drifts which together may cause the wave form 40 to move with respect to the coordinate axes illustrated. Sampling oscilloscope 26 is employed to compensate the effects of such amplitude or time drifts by sampling the voltages $v_1$ and $v_2$ at the sampling times $t_1$ and $t_2$, respectively. The sampling time $t_1$ is chosen to occur at a portion of wave 40 having a zero slope, while the sampling time $t_2$ of the wave 40 is selected to occur where the wave form has a relatively large slope. At the onset of operation of the system, the sampled voltages $v_1$ and $v_2$ are measured and a difference therebetween is stored. This initial difference between voltages $v_2$ and $v_1$ may be designated as $(v_2 - v_1)_o$. Voltage $v_2$ varies as a function of both amplitude and time drift, while voltage $v_1$ varies as a function of amplitude drift alone. Accordingly, the quantity $(v_2 - v_1)$ is representative solely of the timing drift of the system. The difference, therefore, between quantity $(v_2 - v_1)$, when measured at a time subsequent to the initial time, and the stored quantity $(v_2 - v_1)_o$, is representative of any time drift that has occurred between the initial time and the time the measurement was taken. A quantity related to this timing drift error may be combined with the sampling times $t_1$ and $t_2$ in such a way as to shift $t_1$ and $t_2$ back or forward to the points on wave form 40 originally sampled at the initial time, thereby compensating the sampling system for timing drift.

A point $v_3$ of wave form 40 subsequently sampled at sampling time $t_3$ is incrementally advanced as in conventional sampling oscilloscope practice from the left to the right across wave form 40 as indicated by arrow 41. Prior to obtaining each of the $v_3$ samples, a measurement of the quantity $(v_2 - v_1)$ is obtained and is compared to the stored quantity $(v_2 - v_1)_o$. The error signal derived by the comparison operation is used to compensate the sampling time $t_3$. This time drift error signal is also employed to compensate the sampling times $t_1$ and $t_2$ of the next obtained timing reference samples. Thus, it is seen that the timing of the sampling system is continuously adjusted to follow timing drifts of wave form 10 to the right or to the left.

Sampling oscilloscope 26, as noted above, may incorporate a further compensating feature. In order to compensate the samples for upward or downward amplitude drifts of wave form 40, a voltage sample $v_1$ assocaited with a voltage sample $v_3$ is subtracted therefrom, providing a quantity which may be designated as $(v_3 - v_1)$. Since the voltage values $v_1$ and $v_3$ vary to the same extent with respect to each other due to amplitude drifts of wave form 40, the quantity $(v_3 - v_1)$ represents a sampled compensated for amplitude drifts of the system.

In the manner previously described in the derivation of equations (5) and (10), each of five measured wave forms is sampled by the sampling oscilloscope 26 and is passed upon computer command into general purpose computer 30 to be stored and averaged, having been subjected to analog-to-digital conversion by digital voltmeter 29. Discrete Fourier transformations are accomplished by computer 30 in a conventional manner under control of the program supplied for example, by tape reader 31. The computer then performs the conventinal arithmetic steps implied by equations (5) and (10) for generation of the respective quantities $S_{12}$ and $S_{21}$. These quantities may be displayed in a conventional way on indicator 37 after conversion into analog voltages $x$ and $y$ by the respective converters 35 and 36. It is apparent that display 37 may in this manner provide on a cathode ray indicator 37a a graphical presentation of an accumulation of measurements or may provide a printed read out of the computed results. Alternatively, the output of the sampling oscilloscope 26 may be recorded on magnetic tape for shipment to a remotely located data processing center.

The invention is thus a novel apparatus and method of rapid measurement of the complex characteristics of high frequency networks over broad frequency ranges from their time domain transient forward and backward scattered responses. Demonstrated repeatability of results for $S_{21}$ is within 0.1 dB in 10 dB over the frequency range 0.4 to 8 GHz for insertion losses up to 50 dB. Measurements of sample networks are made quickly and accurately, since the apparatus requires no rearrangement between transmission and reflection measurements on a given network, a prior art procedure which is excessively time consuming. The arrangement also permits simultaneous display on a conventional high frequency sampling oscilloscope of a wave form with segments of the display representing the incident pulse, its reflected transient response, and its transmitted transient response.

The invention efficiently measures the scattering coefficients $S_{11}$ and $S_{21}$ without the necessity for disturbing connections to the network under test during the tests, a process which is not only inconvenient but easily leads to errors. A double pass of energy through the network under test to obtain the coefficient $S_{21}$ is also avoided. Such a double pass of energy as used in the prior art can introduce signal attenuation in the instance of high insertion loss networks so great that the signal to be measured is buried below the noise level.

While the invention has been described in its preferred embodiments, it is to be understood that the words which have been used are words of description rather than of limitation and that changes within the purview of the appended claims may be made without departure from the true scope and spirit of the inveniton in its broader aspects.

We claim:

1. Apparatus including transmission line means for measuring the high frequency characteristics of a high frequency network under test comprising:

impulse wave generator means exciting said transmission line means for generating in the presence of said network under test corresponding forward and backward scattered waves, signal divider means having first and second port means for connection in series relation between said impulse wave generator means and said network under test, said signal divider means having third port means, wave sampling head means having first, second, third and fourth port means, and switch means having first, second, and third states, said switch means when in said first state being adapted to couple said signal divider means third port means to first matched load means and said network under test to said wave sampling head means first port means.

2. Apparatus as described in claim 1 wherein said switch means, when in said second state, is adapted to couple said signal divider third port means to said sampling head means second port means and said network under test to second matched load means.

3. Apparatus as described in claim 2 wherein said switch means, when in said third state, is adapted to couple said signal divider third port means to said first matched load means and said network under test to said second matched load means.

4. Apparatus as described in claim 3 including step attenuator means coupled in series between said impulse wave generator means and said signal divider means first port means.

5. Apparatus as described in claim 4 wherein said wave sampling head means third port means is coupled to said impulse wave generator means.

6. Apparatus as described in claim 5 wherein said sampling head means fourth port means is coupled to third matched load means.

7. Apparatus as described in claim 6 further including:
wave sample-and-hold means responsive to said wave sampling head means for holding representations of said impulse wave, said forward scattered wave, and said backward scattered wave,
general purpose computing means responsive to said wave sample-and-hold means adapted to be programmed to compute said high frequency characteristics in response to said held wave representations, and
display means responsive to said computing means for displaying said high frequency characteristics when computed.

8. Apparatus as described in claim 7 wherein said general purpose computing means is adapted to be programmed for:
digitizing said held wave representations of said impulse wave, of said forward scattered wave, and of said backward scattered wave,
performing discrete Fourier transforms on said representations, and
computing from said Fourier transforms the respective reflection and transmission scattering coefficients of said network.

9. Apparatus as described in claim 6 wherein the transmission propagation times between said impulse wave generator means and said step attenuator means, between said step attenuator means and said signal divider means, between said signal divider means and the location of said network under test, between said location of said network under test and said sampling head means first port means, between said signal divider means third port means and said sampling head means second port means, and between said impulse generator means and said sampling head means third port means are substantially in the ratios of 2:2:1:3:2:8.

* * * * *